Patented May 17, 1949

2,470,440

UNITED STATES PATENT OFFICE 2,470,440

MANUFACTURE OF DIAMOND ABRASIVE ARTICLES

Joseph N. Kuzmick, Clifton, N. J., assignor to Raybestos-Manhattan, Inc., Passaic, N. J., a corporation of New Jersey No Drawing. Application March 10, 1945, Serial No. 582,164

13 Claims. (Cl. 51—298)

This invention relates to the manufacture of diamond abrasive articles and in particular is directed to the manufacture of abrasive wheels and like abrasive articles wherein diamond abrasive particles are bonded with a synthetic resin.

The prime object of this invention is the production of synthetic resin bonded diamond abrasive wheels of a greatly superior cutting ability than resinoid bonded diamond abrasive wheels known heretofore without involving any increase in the diamond abrasive content of such wheels. A further object is to provide diamond abrasive articles having a binder of greatly increased bond strength for maximum durability of such articles. Other objects will be apparent as the invention is disclosed.

Bonded diamond abrasive articles for cutting and grinding sintered carbides, etc., are primarily made by two methods. One type utilizes a metallic matrix to hold the diamond particles, the other type utilizes a synthetic resin matrix. Both types have advantages and limitations. Diamond abrasive wheels bonded with a metal matrix are usually very durable but slow cutting; and in service the cutting surface loads or glazes progressively so that periodically the metal bond must be eroded with a dressing tool to expose the diamond particles. Because of this limitation there is considerable reluctance to their use where production is of prime importance. Resinoid bonded wheels do not as a rule require dressing or eroding of the bond as they break down or wear faster, which is reflected in their superior ability to cut or grind faster. Due, however, to the limitations of available resinoid binders, the free cutting character of such bonds cannot be fully utilized because of the low order or durability of diamond wheels so bonded, making them uneconomical to use. To obviate this limitation, various solutions to the problem have been heretofore proposed, such as the use of various inorganic fillers to harden the bond, the use of metal fillers for the same purpose and the substitution of B stage resins for A stage resins as the binder. While all of these harden the bond so that durability is increased, the cutting ability is also greatly impaired.

Furthermore, the present state of the art precludes the elimination of filling or bulking agents which harden and slow the cutting efficiency of such wheels, as the heat and pressure method for molding such wheels limits the percentage of binder which can be used. The commercial binders available for this purpose must contain a certain amount of filling or abrasive material to attain their maximum bond strength and to insure the retention of the binder in the mold during molding. One exception to this is the use of B stage resins in place of A stage products normally used. B stage resins would meet the requirement of an ideal bond for diamond abrasive except for the fact that because of their advanced degree of polymerization and consequent increase in molecular weight, such resins no longer go through a liquid or fluid phase on heating and therefore have lost their ability to wet the diamond particles, which is reflected in poor bond strength and consequent reduction in durability of the product.

I have found the solution of the problem to be in the type of resinoid binder used, and as a result of the practice of my invention, I find that the cutting ability of resinoid bonded diamond wheels can be retained at their maximum potential efficiency without sacrificing durability.

In the manufacture of synthetic resin bonded diamond wheels, the synthetic resins used are those generally characterized as phenol aldehyde type. Specifically these resins are those resulting from the condensation of monohydric phenol ($C_6H_5OH$) and formaldehyde. Synthetic resins resulting from the condensation of dihydric phenols such as resorcinol ($C_6H_4(OH)_2$) and an aldehyde such as formaldehyde have also been proposed as binders. Resins of this latter type have not come into general use because if the condensation reaction of such resins were carried out under conditions identical with phenol formaldehyde types, the reaction is uncontrollable and proceeds with explosive violence to a fully polymerized product. Resorcinol aldehyde resins have properties such as greater strength, hardness and adhesiveness as compared with phenol aldehyde resins and these properties have been taken advantage of in the development of liquid resorcinol aldehyde resins for laminating plywood. However, solid pulverized intermediate resorcinol aldehyde resins characterized as being potentially reactive are not available commercially and it is this type that I have discovered may be made eminently suitable for bonding diamond abrasive wheels.

Because of the high volumetric content of resin bond in diamond bonded wheels, and for other reasons, the use of liquid resorcinol aldehyde resins as a bond is practically ruled out. While it is impractical to produce solid intermediate potentially reactive resorcinol aldehyde resins, it is possible to produce these resins in solid permanently fusible form by initially reacting resorcinol with less than molar proportions of paraformaldehyde or formaldehyde. The resulting product can be further reacted to infusibility by addition of methylene bearing agents such as paraformaldehyde or hexamethylenetetramine. However, such a resin is not suitable for the purpose intended for two reasons, viz., they are very sensitive to atmospheric moisture and become sticky and coalesce. In the final cure the reaction on heating proceeds at such a rate that the hardening agent, such as paraformaldehyde or hexamethylenetetramine, cannot completely diffuse or dissolve in the intermediate resin, resulting in a structure composed of nuclei of over-hardened resin surrounded by a weak incompletely polymerized portion.

I have discovered that if a solid intermediate fusible resorcinol resin is reacted or copolymerized with furfuryl alcohol, the methylene bearing hardening agent can be completely diffused or dissolved in the reaction product or copolymer to provide a stable potentially reactive solid resin which can be pulverized and which is unaffected by atmospheric moisture. Furthermore, this product has the unique property of responding to solubility tests for A stage phenolic resins, whereas the heat test characterizes the product as a jell. This characteristic makes the resin ideally suitable as a bond for diamond abrasive grains. Unlike B stage phenolic resins, this product has the property of wetting the diamond abrasive particles under the influence of heat and pressure and when subsequently cured, the adhesion is of such magnitude that when ruptured, the fracture occurs through the diamond particles. This copolymer or reaction product of resorcinol aldehyde and furfuryl alcohol resin responds to all the requirements of an ideal bond for diamond abrasive wheels viz.:

(1) Tensile strength approximately 100% greater than phenolic resins now in general use to provide maximum bond strength for durability.

(2) Maximum wetting or adhesive properties.

(3) Minimum flow under heat and pressure in order to reduce or eliminate inert fillers, which is reflected in the freer or faster cutting ability.

As an example of a copolymerized resorcinol aldehyde furfuryl alcohol resin suitable for my purpose I take: 5 kilograms of resorcinol and 1 kilogram of paraformaldehyde. The resorcinol is charged into a jacketed reacting kettle with provision for circulating steam or cold water and high speed stirring for agitating the contents of a kettle. The kettle is heated by means of steam and the resorcinol brought to a temperature of approximately 120° C. At this point steam is turned off and the paraformaldehyde is added in increments of 200 grams with the agitator going so as to disperse the charge throughout the mass as quickly as possible as the reaction is exothermic and rapid. Cooling water is now introduced into the jacket and the temperature of the mass is kept between 130° and 140° C. After all the paraformaldehyde has been added the temperature is allowed to rise to 170° C. assisted by means of steam if necessary. When this temperature is reached, a sample on cooling should form a hard friable reddish resin. This permanently fusible and water soluble resin is allowed to remain in the kettle at the temperature indicated. In another jacketed kettle equipped with a stirring device, 1¼ liters of furfuryl alcohol is introduced and into this is stirred 5 cc. of diethyl sulphate and the temperature raised to approximately 120° C. At this point, the heated furfuryl alcohol diethyl sulphate mixture is run into the kettle containing the hot resorcinol aldehyde resin, with the agitator running thereby forming a solution.

The diethyl sulphate catalyzes the furfuryl alcohol and initiates a resin forming reaction of said alcohol, which is indicated by the spontaneous boiling of the dissolved resin. Boiling is permitted to continue with the temperature held at 160° to 170° C. and after six to eight minutes of boiling the viscosity of the mass begins to increase rapidly and goes over to a jell phase at which time it is discharged from the kettle. The resulting deep red brown liver-like resin mass at this stage appears to be an intermediate polymerized or low molecular weight furfuryl alcohol resin with the fusible resorcinol aldehyde resin in solid solution. This resin mass is transferred onto heated differential rolls equipped with scraper bars, and 400 grams of hexamethylenetetramine is rolled into the mass at a temperature of 100 to 110° C., the hexamethylenetetramine completely dissolving in the resin mass after which the resin is cut off the rolls and is allowed to cool. The resulting hard friable resin is ground through a 200 mesh screen and is ready for use. The resin now has lost its water soluble properties and is soluble in alcohols and ketones and on heating does not go through a fluid phase but softens to a jell phase with exceptional adhesive properties. If heating is continued it is converted or copolymerized to an extremely strong infusible product. It is not clear whether the polymerization to infusibility is one of inter-molecular growth of two distinct resins or one of an increase in molecular weight of a copolymer. The latter theory is supported by specimens fully polymerized under heat and pressure into perfectly clear and transparent red brown infusible products which exhibit physical properties superior in strength, toughness and adhesiveness as compared with resorcinol aldehyde resins known in the art.

As an example of a diamond bonded abrasive wheel utilizing the herein described resorcinol aldehyde furfuryl alcohol bond I take the following proportions in order to make a wheel ⅝" in diameter, ¼" thick, and having a ⅛" arbor hole. The volume of such a wheel is .0736 cu. in. and therefore requires a total weight of diamond, bond and filler of 13.1 carats in order to obtain a molded wheel of full density which in this case would be 178 carats per cubic inch:

| | Carats |
|---|---|
| Resin bond | 5.85 |
| 400 mesh quartz | 1.95 |
| 100 mesh diamond abrasive | 5.3 |

The above ingredients are thoroughly comingled, as for example in a small jar mill and loaded into a hardened steel mold of the dimensions mentioned above, this mold being equipped with a follower plate or plunger so that when completely closed the cavity represents the volume and size given in this example. The loaded mold is transferred to a hydraulic press equipped with heated platens and the mold is closed requiring a unit pressure of approximately 2,000 lbs./sq. in. or sufficient pressure to completely close the mold and insure the proper volumetric dimensions of the wheel to be molded. The temperature of the press platens is 350° F. and during the curing cycle, which is 20 minutes, the resin bond under the influence of heat and pressure, goes through a soft jell phase completely wetting the particles of diamond and quartz filler without the undesirable bleeding of binder which has to be contended with when using A stage resin bonds. With the use of A stage resin bonds, with which products the present invention is to be contrasted, a resultant heavy flash of bond is obtained which makes it extremely difficult to discharge the article from the mold, and of course represents a loss of binder which normally should remain in the product. On discharging the wheel of the present invention from said mold it is ready for use by a simple lapping of the periphery in order to better expose the diamond abrasive particles on the surface.

In order to disclose the superiority of diamond bonded wheels made in accordance with my invention, diamond wheels were made as shown in the following table. The volumetric ratio of resin was adjusted to the maximum practical content for A and B stage phenol-aldehyde resins and a minimum filler content consistent with the best possible durability, and cutting ability. The proportions shown in the table are to be considered as representative of the art in present commercial practice. The example of the invention utilizing the resorcinol aldehyde furfuryl alcohol resin as a binder was held to the same volumetric proportions of resin and filler as the two other examples, primarily to make the comparison on an even basis although at a slight disadvantage in cutting ability. The three examples shown in the table were made into test bars for tensile strength and hardness determinations and from the same mixtures wheels were molded specifically known as die grinding wheels, 5/8" in diameter, 1/4" thick and 1/8" mandrel. The test bars and wheels were molded to a density of 35.6 grams per cubic inch for 45 minutes @ 350° F. at a unit pressure of one ton per square inch.

Table A

|  | Example #1 | Example #2 | Example #3 |
|---|---|---|---|
|  | Per cent by vol. | Per cent by vol. | Per cent by vol. |
| Resorcinol aldehyde furfuryl alcohol resin | 55 |  |  |
| Phenol aldehyde resin, B stage |  | 55 |  |
| Phenol aldehyde resin, A stage |  |  | 55 |
| Ground quartz | 20 | 20 | 20 |
| #100 mesh diamond abrasive | 25 | 25 | 25 |
|  | 100 | 100 | 100 |
| Tensile lbs. per sq. in., lbs. | 6,800 | 3,800 | 3,200 |
| Rockwell Hardness F | 97 | 81 | 70 |

The marked improvement in bond strength and hardness in the abrasive product of Example #1 over the abrasive products of Example #2 and #3 are obvious and suggest that a change of this magnitude would have considerable influence on the bonded wheels in service. This is conclusively shown in the following table showing the durability and cutting ability of the three examples made into wheels as specified above and consumed in internal grinding tungsten carbide drawing dies using a standard high speed grinder with a wheel speed of 4000 S. F. per minute:

Table B

|  | Weight of wheel | Tungsten carbide removed | Maximum depth of cut per pass without heat checking die |
|---|---|---|---|
|  | Grams | Grams |  |
| Example #1 | 2.62 | 162 | .002 |
| Example #2 | 2.62 | 71 | .001 |
| Example #3 | 2.62 | 86 | .001 |

This table, showing the results of a practical application, clearly demonstrates the vastly superior results flowing from the practice of the present invention. The economical aspect is obvious as the table shows an approximate 100% increase of carbide removed in a given time as compared to wheels bonded with phenol aldehyde resins used heretofore.

The proportions of the ingredients given for the abrasive product of Example #1 may be varied, and in particular the volumetric ratio of resin may be increased, and the filler ratio decreased in proportion or completely eliminated, with an increase in cutting ability without markedly effecting the durability. This is not practical with A or B stage phenol aldehyde resins, as it is a limitation of A stage resins to require backing or reinforcing with inert fillers to provide a moldable mix, while on the other hand B stage resins are practical to handle without inert fillers but when so used as a bond results in a degree of high wheel wear which is uneconomical.

As a practical volumetric range, I find that the ingredient proportions may be varied as follows:

| | Per cent |
|---|---|
| Resorcinol aldehyde furfuryl alcohol resin | 50 to 90 |
| Filler | 0 to 25 |
| Diamond abrasive | 6 to 25 |

The proportion of furfuryl alcohol as a copolymeric constituent may also be varied, although the example given above has worked out most advantageously. Substantially increasing the proportion of furfuryl alcohol over that shown in the example given, decreases the tensile strength and hardness of the end product. Conversely with a substantial reduction, degradation of the products is noticeable as the methylene hardening agent does not completely dissolve or diffuse in the resin mass before conversion to infusibility. However, based on the initial weight of the resorcinol aldehyde used, I find that a range of 10% to 50% of furfuryl alcohol provides advantageous results.

The proportion of diethyl sulphate for initiating the reaction of the furfuryl alcohol may be varied, but should so be adjusted as to promote a smooth reaction. The example above given calls for approximately 1/2 of 1% on the weight of furfuryl alcohol used, but this proportion can vary between 1/8 of 1% to 2% depending on the desired rate of reactivity. It is also to be understood that there are a large number of equivalents for diethyl sulphate which are effective catalytic agents for the intended purpose. For example, inorganic acids such as sulphuric, hydrochloric and salts thereof, and organic acids such as acetic, maleic and phthalic may be used, to maintain an acid reacting system.

Although in the example above given, a mix of dry constituents is used, it is to be understood that part of the pulverized resorcinol aldehyde furfuryl alcohol resin may be replaced with a liquid resin for greater plasticity, as is well known in the abrasive wheel art. Furthermore, while the curing time, temperature and pressure employed in the examples are about optimum, they may be varied to meet unusual conditions without seriously affecting the end product.

As an equivalent for the paraformaldehyde in the initial reaction product between the resorcinol and paraformaldehyde above given, I may use other aldehydes such as furfuryl aldehyde, formaldehyde or trioxane.

As an equivalent for the hexamethylenetetramine used as the hardening agent in the given example I may advantageously use trioxane, inasmuch as this liberates formaldehyde very readily, particularly when the pH is such that the product is on the slightly acid side of neutral. I may also use, however, paraformaldehyde which is readily milled in and dispersed in a fashion similar to the hexamethylenetetramine given in the described example.

The manufacture of diamond abrasive articles in accordance with the practice of the present invention and the many advantages thereof over prior resinoid bonded diamond abrasive articles will in the main be fully apparent from the above detailed description thereof and the above comparison made with resinoid bonded diamond abrasive wheels of prior makes or manufacture. It will be further apparent that many changes may be made in the product and method of the present invention without departing from the spirit or essence of the invention as defined in the following claims.

I claim:

1. The method of making a resin bonded diamond abrasive body which consists in reacting a resorcinol aldehyde resin and furfuryl alcohol in an acid system, in preparing a mix thereof with diamond abrasive grains and in molding the mix under heat and pressure to convert the resin to the final infusible state.

2. The method of making a resin bonded diamond abrasive body which consists in reacting a permanently fusible resorcinol aldehyde resin and furfuryl alcohol in an acid system, in combining the same with a methylene hardening agent to produce a potentially reactive resin, in preparing a mix of the potentially reactive resin with diamond abrasive grains and in molding the mix under heat and pressure to convert the resin to the final infusible state.

3. The method of making a resin bonded diamond abrasive body which consists in reacting a permanently fusible resorcinol aldehyde resin and an acid catalyzed furfuryl alcohol, in combining the same with a methylene hardening agent to produce a potentially reactive resin having the property of softening to a jell phase but not melting upon heating, in preparing a mix of such resin with diamond abrasive grains and in molding the mix under heat and pressure to convert the resin to the final infusible state.

4. The method of making a resin bonded diamond abrasive body which consists in taking a solid pulverized resorcinol aldehyde-furfuryl alcohol potentially reactive resin having the property of softening to a jell phase but not melting upon heating, in preparing a mix thereof with diamond abrasive grains and in molding the mix under heat and pressure to convert the resin to the final infusible state.

5. The method of claim 1 in which the ingredients have the following volumetric proportions: the bond 50% to 90%, the diamond abrasive grain 6% to 25%, and a filler 0% to 25%.

6. The method of claim 3 in which the ingredients have the following volumetric proportions: the bond 50% to 90%, the diamond abrasive grain 6% to 25%, and a filler 0% to 25%.

7. A diamond abrasive body comprising diamond abrasive grains bonded with a synthetic resin composed of a heat reaction product of a solid pulverized resorcinol aldehyde-furfuryl alcohol potentially reactive resin having the property of softening to a jell phase but not melting upon heating, converted to the final infusible state.

8. A diamond abrasive body comprising diamond abrasive grain bonded with a synthetic resin composed of a reaction product of resorcinol aldehyde resin and furfuryl alcohol in an acid system converted to the final infusible state.

9. A diamond abrasive body comprising diamond abrasive grain bonded with a synthetic resin composed of a reaction product of a permanently fusible resorcinol aldehyde resin and furfuryl alcohol in an acid system combined with a methylene bearing hardening agent and converted to the final infusible state.

10. A diamond abrasive body comprising diamond abrasive grain bonded with a synthetic resin composed of a reaction product of a solid permanently fusible resorcinol aldehyde resin and an acid catalyzed furfuryl alcohol combined with a methylene bearing hardening agent and converted to the final infusible state.

11. The diamond abrasive body as claimed in claim 7 in which the ingredients have the following volumetric proportions: the resorcinol aldehyde-furfuryl alcohol resin 50% to 90%, the diamond abrasive grain 6% to 25%, and a filler 0% to 25%.

12. The diamond abrasive body as claimed in claim 8 in which the ingredients have the following volumetric proportions: the bond 50% to 90%, the diamond abrasive grain 6% to 25%, and a filler 0% to 25%.

13. The diamond abrasive body as claimed in claim 10 in which the ingredients have the following volumetric proportions: the bond 50% to 90%, the diamond abrasive grain 6% to 25%, and a filler 0% to 25%.

JOSEPH N. KUZMICK.

REFERENCES CITED

The following references are of record in the file of this patent:

UNITED STATES PATENTS

| Number | Name | Date |
|---|---|---|
| 1,900,386 | Kuzmick | Mar. 7, 1933 |
| 1,907,088 | Novotny | May 2, 1933 |
| 1,915,282 | Beans | June 27, 1933 |
| 1,924,748 | Novotny et al. | Aug. 29, 1933 |
| 1,981,970 | Sanford | Nov. 27, 1937 |
| 2,334,526 | Allison | Nov. 16, 1943 |
| 2,367,312 | Reineck | Jan. 16, 1945 |
| 2,383,790 | Harvey | Aug. 28, 1945 |